(12) United States Patent
Renollett et al.

(10) Patent No.: US 10,385,879 B2
(45) Date of Patent: Aug. 20, 2019

(54) EXPLOSION RESISTANT ELECTRO-PNEUMATIC CONTROLLER

(71) Applicant: TESCOM CORPORATION, Elk River, MN (US)

(72) Inventors: Jacob T. R. Renollett, Andover, MN (US); Eric J. Burgett, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 51 days.

(21) Appl. No.: 15/193,490

(22) Filed: Jun. 27, 2016

(65) Prior Publication Data
US 2017/0368393 A1  Dec. 28, 2017

(51) Int. Cl.
| A62C 4/02 | (2006.01) |
| F15B 11/00 | (2006.01) |
| F16K 27/00 | (2006.01) |
| G05B 11/50 | (2006.01) |
| G05D 16/20 | (2006.01) |

(52) U.S. Cl.
CPC ............. *F15B 11/006* (2013.01); *A62C 4/02* (2013.01); *F16K 27/00* (2013.01); *G05B 11/50* (2013.01); *G05D 16/20* (2013.01)

(58) Field of Classification Search
CPC .......... A62C 4/02; G05B 11/50; G05D 16/20; F16K 27/00; F15B 11/006
See application file for complete search history.

(56) References Cited

U.S. PATENT DOCUMENTS

| 3,245,619 | A | * | 4/1966 | Kreuter | ................ | G05D 23/185 |
| | | | | | | 137/85 |
| 3,334,642 | A | * | 8/1967 | Borthwick | .............. | F15B 5/003 |
| | | | | | | 137/85 |
| 3,349,787 | A | * | 10/1967 | Thieme | ..................... | F15B 9/09 |
| | | | | | | 137/269 |
| 4,213,478 | A | * | 7/1980 | Olsen | ...................... | F15B 5/003 |
| | | | | | | 137/85 |
| 4,627,286 | A | * | 12/1986 | Pehlgrim | ................ | G01L 19/14 |
| | | | | | | 73/431 |
| 4,970,898 | A | * | 11/1990 | Walish | ................ | G01L 19/0038 |
| | | | | | | 73/706 |
| 5,159,949 | A | * | 11/1992 | Prescott | .................. | F15B 5/003 |
| | | | | | | 137/82 |
| 5,257,639 | A | * | 11/1993 | Prescott | .................. | F15B 5/003 |
| | | | | | | 137/82 |

(Continued)

FOREIGN PATENT DOCUMENTS

EP          1138994 A2    10/2001

OTHER PUBLICATIONS

Search Repoert for International Application No. PCT/US2016/040621, dated Oct. 12, 2016.

(Continued)

*Primary Examiner* — William M McCalister
(74) *Attorney, Agent, or Firm* — Marshall, Gerstein & Borun LLP

(57) ABSTRACT

An electro-pneumatic controller includes a base having a body, a top surface, and a bore formed within the body; a cover coupled to the base, the cover having an open end with a rim, the rim contacting the top surface of the base; a plurality of fluid flow paths formed within the base; and at least one flame arrestor disposed within one of the fluid flow paths.

20 Claims, 8 Drawing Sheets

(56) References Cited

U.S. PATENT DOCUMENTS

| | | | | |
|---|---|---|---|---|
| 5,439,021 | A * | 8/1995 | Burlage | F15B 13/0405 |
| | | | | 137/269 |
| 5,948,988 | A * | 9/1999 | Bodin | G01L 19/0038 |
| | | | | 73/706 |
| 7,150,194 | B2 * | 12/2006 | Pepperling | A62C 4/00 |
| | | | | 73/706 |
| 2011/0108292 | A1 * | 5/2011 | Moyer | A62C 4/00 |
| | | | | 169/48 |
| 2013/0015379 | A1 * | 1/2013 | Schaible | F15B 15/065 |
| | | | | 251/12 |
| 2015/0115182 | A1 * | 4/2015 | Inoue | F15B 5/006 |
| | | | | 251/30.01 |

OTHER PUBLICATIONS

Written Opinion for International Application No. PCT/US2016/040621, dated Oct. 12, 2016.

\* cited by examiner

US 10,385,879 B2

EXPLOSION RESISTANT ELECTRO-PNEUMATIC CONTROLLER

FIELD OF THE DISCLOSURE

The present invention relates generally to controllers for a process control valve, and, more specifically, to an explosion resistant electro-pneumatic controller.

BACKGROUND OF THE DISCLOSURE

Electro-pneumatic controllers (also called electro-pneumatic regulators) are typically used to control the pressure of control fluid used to position a pneumatically-controlled device, such as a regulator. For example, an electro-pneumatic controller can be used to control the pressure of control fluid into a pneumatic actuator of a process control valve or regulator to position the process control valve or regulator. The electro-pneumatic controllers may include one or more passageways to receive the control fluid, and one or more solenoid valves may control the flow of the control fluid through the passageways. The one or more solenoid valves may be in communication with a microprocessor, which may be in communication with one or more sensors disposed outside of the electro-pneumatic controller to control the electro-pneumatic controller and/or the process control valve or regulator. The one or more passageways, one or more solenoid valves, and the microprocessor may all be disposed within a housing that includes a base and a cover.

In some cases, the control fluid may be flammable or explosive in nature. In such cases, the possibility of an internal explosion may be too great to use electro-pneumatic controllers. A need exists for an explosion resistant electro-pneumatic controller.

SUMMARY

In one embodiment, an electro-pneumatic controller includes a base having a body, a top surface, and a bore formed within the body; a cover coupled to the base, the cover having an open end with a rim, the rim contacting the top surface of the base; a plurality of fluid flow paths formed within the base; and at least one flame arrestor disposed within one of the fluid flow paths.

The electro-pneumatic controller may include one or more of the following preferred forms.

In some preferred forms, the electro-pneumatic includes six flame arrestors and/or a breathing flame arrestor.

In other preferred forms, the electro-pneumatic controller includes one or more of a dome loading pressure sensor, an internal pressure sensor, and an external pressure sensor.

In yet other preferred forms, the dome loading pressure sensor, internal pressure sensor, and external pressure sensor may each have flame arrestors fluidly coupled thereto.

In yet other preferred forms, the process fluid is flammable.

In yet other preferred forms, the flame arrestors are capable of withstanding pressure created by an internal explosion.

In yet other preferred forms, the dome load port includes a single flame arrestor.

In another preferred embodiment, a process control system includes a regulator having a housing with a top portion; and an electro-pneumatic controller having a base including a body, a top surface, and a bore formed within the body; a cover coupled to the base, the cover having an open end with a rim, the rim contacting the top surface of the base; a plurality of fluid flow paths formed within the base; and at least one flame arrestor disposed within one of the fluid flow paths.

DETAILED DESCRIPTION OF THE DISCLOSURE

Figure 1:
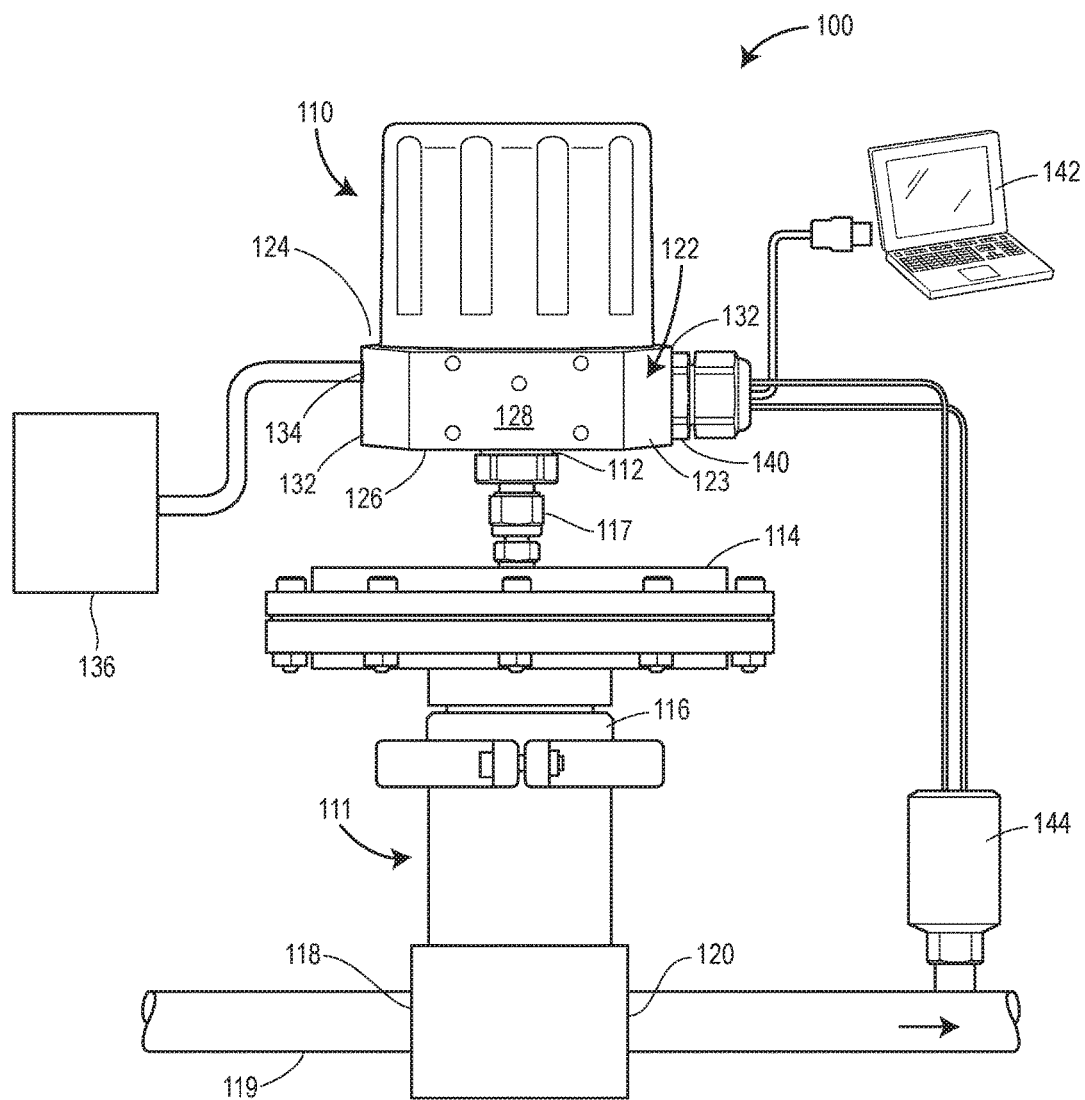
FIG. 1 is a schematic view of a process control system including an electro-pneumatic controller of the present disclosure.

Referring now to FIG. 1, a process control system 100 includes an electro-pneumatic controller 110 that is operatively coupled to a regulator 111. More specifically, an outlet port 112 of the electro-pneumatic controller 110 is operatively coupled to a top portion 114 of a housing 116 of the regulator 111 via an adaptor 117, for example. The regulator 111 includes an inlet 118 for receiving inlet pressure in a pressure line 119, and an outlet 120 for directing outlet pressure downstream the regulator 111 in the process line 119.

The electro-pneumatic controller 110 includes a base 122 having a body 123 with a top surface 124, a bottom surface 126, a front portion 128, a rear portion 130 (FIG. 2), and a pair of side walls 132 extending from the front portion 128 to the rear portion 130 of the body 123. One side wall 132 of the pair of side walls 132 includes a supply port 134 for receiving supply pressure from an external source, such as supply source 136. In one example, a supply pressure of up to 120 psig/8.2 bar, with 110 psig/7.5 bar being typical, is provided. The other side wall 132 includes two conduit connections, a first conduit connection 140 for USB wiring and a second conduit (not shown) connection for internal wiring.

As further depicted in FIG. 1, a computer 142 may be communicatively coupled to the electro-pneumatic controller 110 via the first conduit connection 140 for USB wiring. A transducer 144 may be disposed downstream the outlet 120 of the regulator 111 and may be communicatively coupled to the electro-pneumatic controller 110. In one example, the electro-pneumatic controller 110 senses system pressure through input, e.g., a feedback signal, from the transducer 144, for example. The electro-pneumatic controller 110 reads the input and compares it to a setpoint pressure, which the electro-pneumatic controller 110 may receive from an external source, such as the computer 142, or from a profile on its onboard memory, for example.

Figure 2:
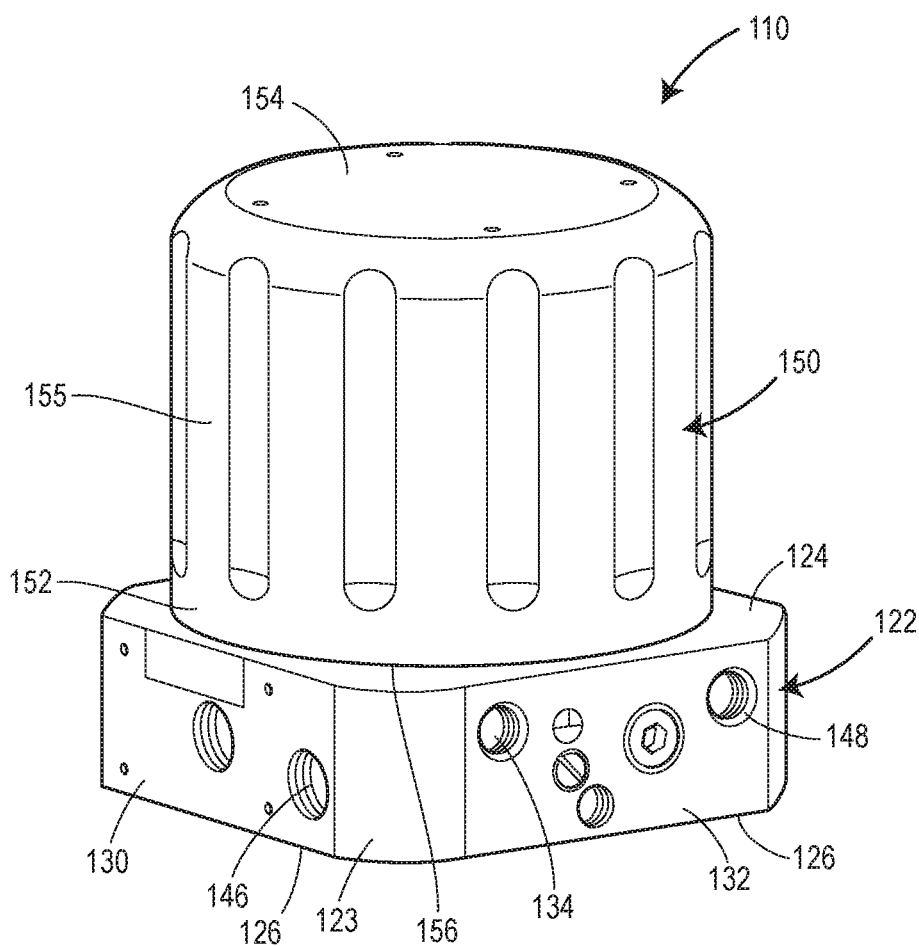
FIG. 2 is a side perspective view of the electro-pneumatic controller of FIG. 1.

More specifically, and referring now to FIG. 2 the rear end 130 of the body 124 of the base 122 includes a gauge port 146, and the side wall 132 includes an exhaust port 148, in addition to the supply port 134. The electro-pneumatic controller 110 also includes a cover 150 that is coupled to the base 122. The cover 150 includes an open end 152, a closed end 154 disposed opposite the open end 152, and an elongate body 155 extending from the open end 152 to the closed end 154. The open end 152 further includes a rim 156 that contacts the top surface 124 of the base 122.

Figure 3:
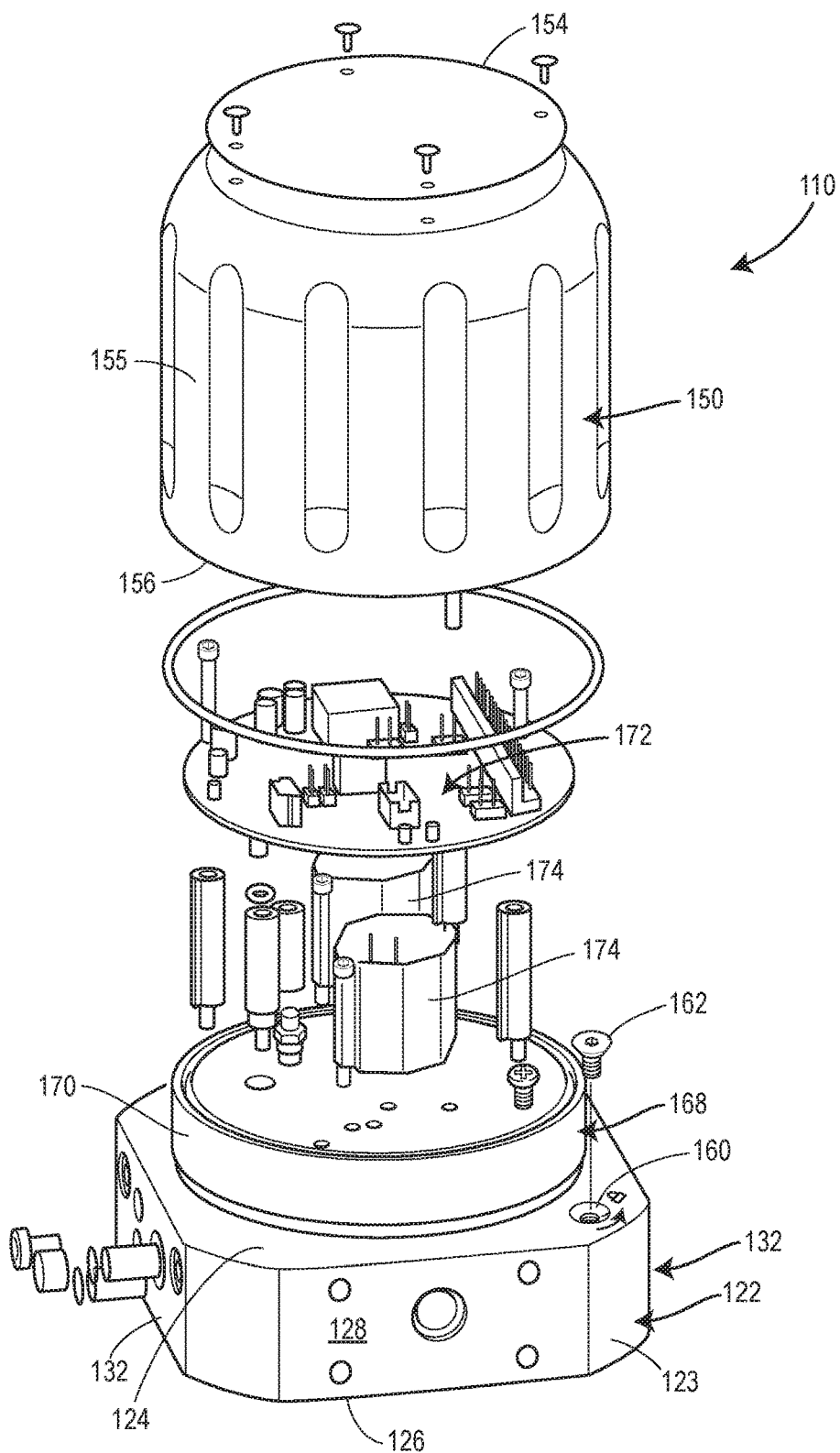
FIG. 3 is an exploded perspective view of the electro-pneumatic controller of FIG. 1.
Figure 4:
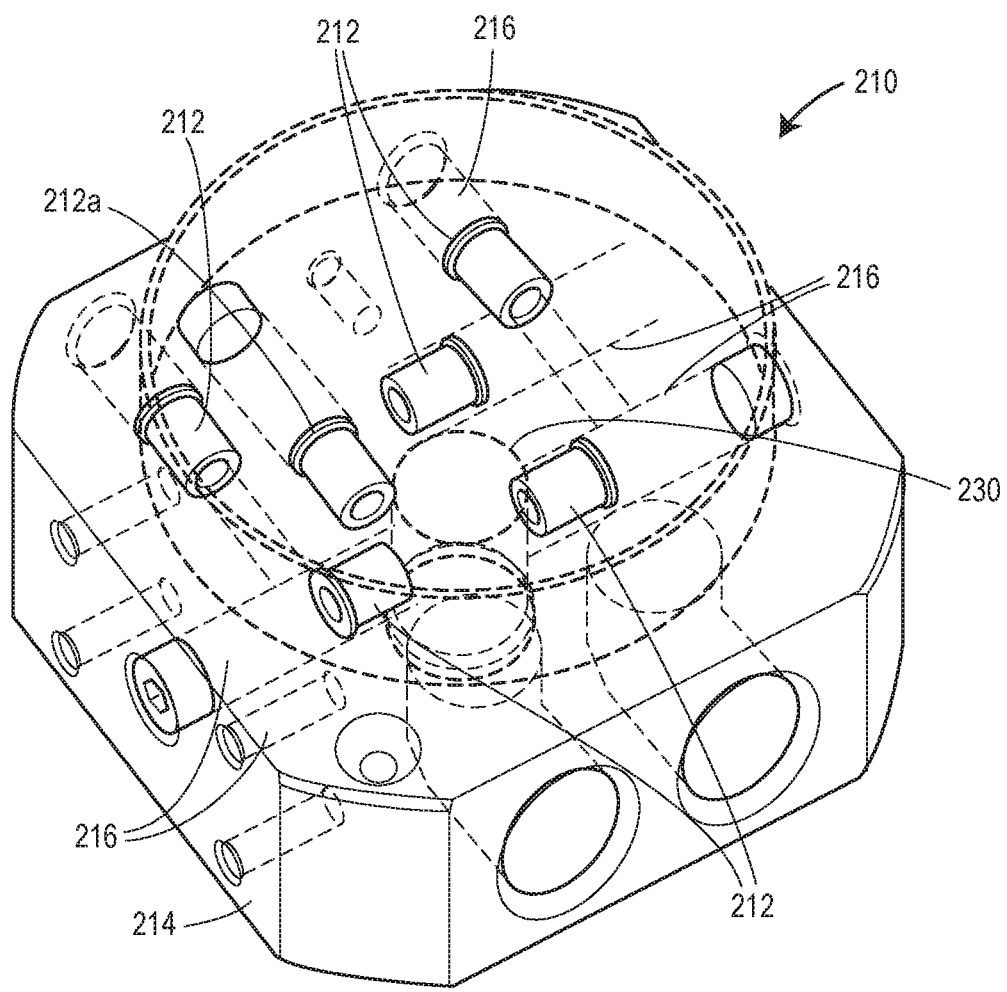
FIG. 4 is a transparent top perspective view of the electro-pneumatic controller of FIG. 1 illustrating fluid flow paths and flame arrestors disposed in the fluid flow paths.
Figure 5:
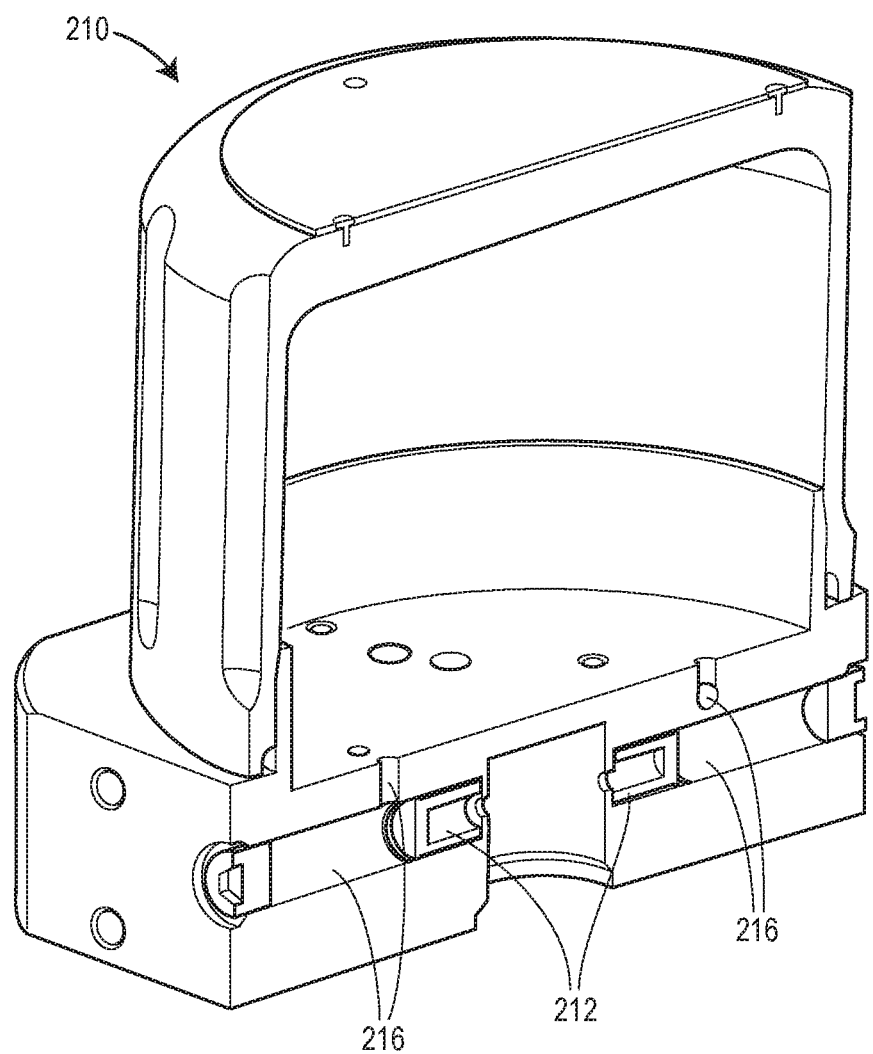
FIG. 5 is a perspective cross-sectional view of the electro-pneumatic controller of FIG. 1.
Figure 6:
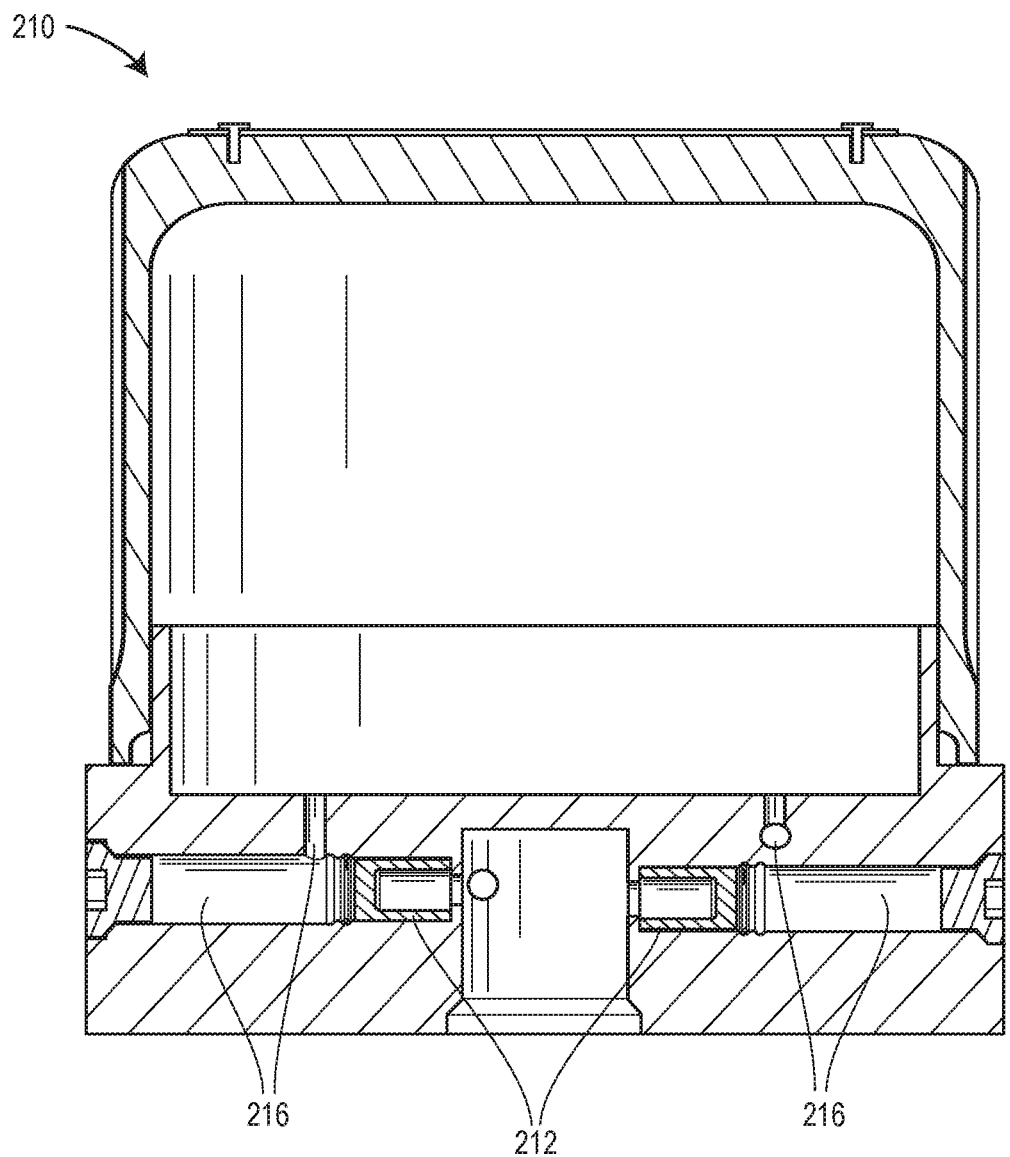
FIG. 6 is a lateral cross-sectional view of the electro-pneumatic controller of FIG. 1.
Figure 7:
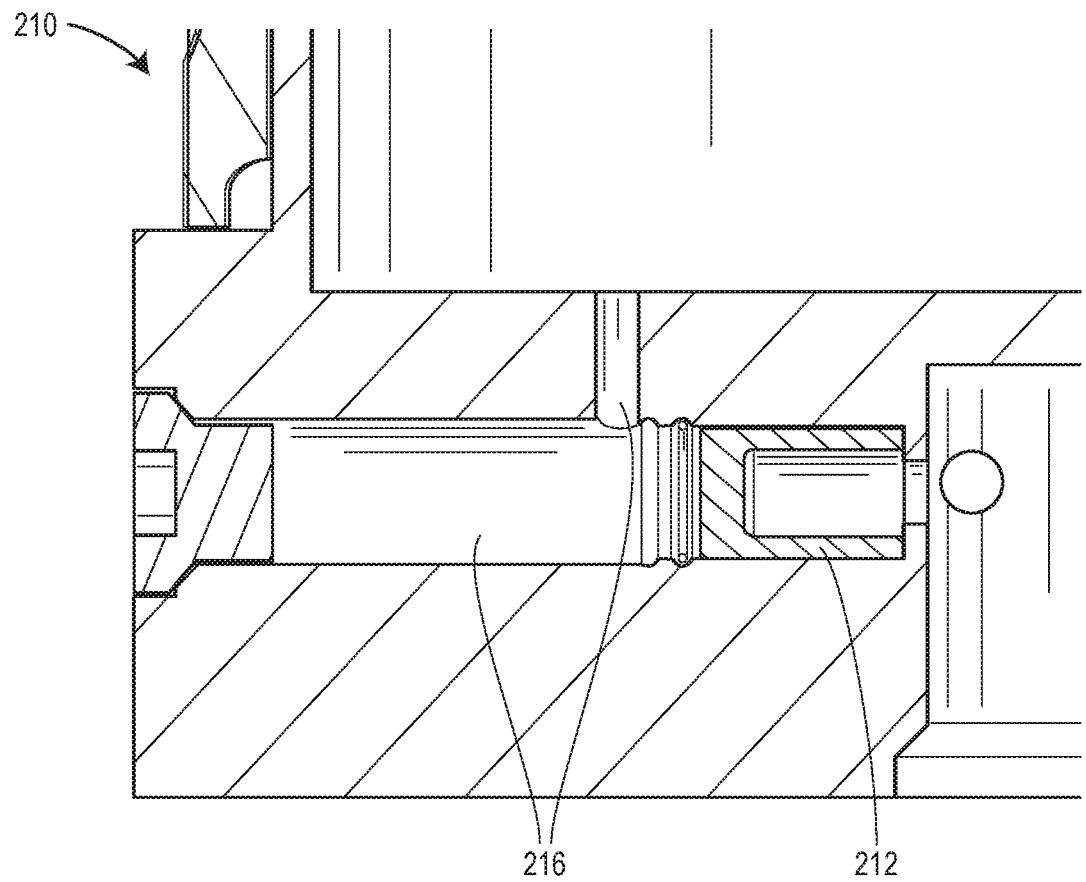
FIG. 7 is a close-up cross-sectional view of a flame arrestor of the electro-pneumatic controller of FIG. 6.

As depicted, for example, in FIG. 3, a bore 160 is formed within the body 123 of the base 122 in the top surface 124 of the base 122. A locking mechanism162 is disposed within the bore 160 of the base 122. The locking mechanism 162 includes a top surface that is flush with the top surface 124 of the base 122, for example.

The base 122 further includes an annular projection 168 that upwardly extends from the top surface 124 of the base 122. The annular projection 168 further includes an outside surface 170 having at least one thread or a plurality of threads. The cover 150 likewise includes an inside surface (not shown) also having at least one thread or a plurality of threads. When the cover 150 is coupled to the base 122, the threads on the inside surface of the cover 150 engage the threads on the outside surface 170 of the annular projection 168 to secure the cover 150 to the base 122.

The annular projection 168 has a hollow interior and receives circuitry 172, one or more valves 174, such as a solenoid valve and/or an inlet valve and an exhaust valve, and other components of the electro-pneumatic controller 110. The cover 150 encloses at least the circuitry 172, the one or more valves 174 and other components of the electro-pneumatic controller 110 when the cover 150 is disposed on the top surface 124 of the base 122, for example.

In operation, the electro-pneumatic controller 110 senses system pressure through input, e.g., a feedback signal, of the transducer 144 (FIG. 1) that is mounted downstream the outlet 120 in the process line 119 (FIG. 1). If the feedback signal is lower than a programmed setpoint, the electro-pneumatic controller 110 activates one valve 174, such as an inlet valve, allowing pressure to flow into the regulator 111. This causes a main valve (not shown) of the regulator 111 to open up, resulting in an increase in downstream system pressure. The electro-pneumatic controller 110 continues to send pressure into the regulator 111 until sensed feedback from the transducer 144, for example, is equal to the setpoint pressure. At that point, the valve 174, such as the inlet valve, is closed, stabilizing the system at that pressure.

If, however, the feedback signal from the transducer 144, for example, sensed by the electro-pneumatic controller 110 is higher than the setpoint pressure, the electro-pneumatic controller 110 activates another valve 174, such as an exhaust valve, to release pressure from the regulator 111. The result is a decrease in downstream system pressure. The electro-pneumatic controller 110 continues to exhaust the pressure until the feedback signal received is equal to the setpoint. At that point, the exhaust valve 174 closes, stabilizing the system at that pressure.

When the electro-pneumatic controller 110 is used in a process environment having a flammable or combustible process fluid, to prevent a flame, a fire, or an explosion from spreading from the module to the potentially combustible outside environment, a flame arrestor may be disposed within a channel or a passage of the module. A flame arrestor permits fluid to flow through the channel or passage and, at the same time, prevents (e.g., extinguishes) a flame, a fire, or an explosion from reaching the outside environment by absorbing heat associated with the flame, fire, or explosion. In other words, the flame arrestor enables a fluid to enter the module from the outside environment while preventing a fire or explosion from exiting a housing or enclosure of the module and igniting the outside environment.

Turning now to FIGS. 4-8 one example of an electro-pneumatic controller 210 constructed, in accordance with the principles of the present invention, to accommodate a plurality of the flame arrestors 212. The process control device 210 illustrated in FIGS. 4-8 takes the form of a valve controller (e.g., the TESCOM™ ER3000 or ER5000 controller) that includes a housing or enclosure 214 and a plurality of fluid flow passageways 216 formed or defined in the housing 214. For clarity purposes, only some of the fluid flow passageways 216 are referenced in FIGS. 4-8. The valve controller is configured to monitor and control the position of a valve. Thus, while not illustrated in FIGS. 4-8, the process control device 210 may also include sensors, electrical circuitry, amplifiers, converters, and/or other electrical components arranged in and/or on the housing 214.

The fluid flow passageways 216 are formed or defined in the housing 214. Each fluid flow passageway 216 extends between one of the walls of the housing 214 and an interior portion of the housing 214. Each of the fluid flow passageways 216 thus enables fluid communication between the process control device 210 (e.g., the electrical components of the process control device 210) and the environment outside of the process control device 210. While each fluid flow passageway 216 extends along or is parallel to an axis, one or more fluid flow passageways 216 can, in other examples, extend along a different axes (e.g., an axis oriented at an angle) or the fluid flow passageways may be curved. Each of the fluid flow passageways 216 may be configured to accommodate a flame arrestor 212.

When a flame arrestor 212 is arranged or disposed in one of the fluid flow passageways 216 of the process control device 210, the flame arrestor 212 enables fluid flow between the process control device 210 and the environment outside of the process control device 210, and, simultaneously, prevents a flame, a fire, or an explosion from propagating between the process control device 210 and the environment outside of the process control device 210.

Figure 8:
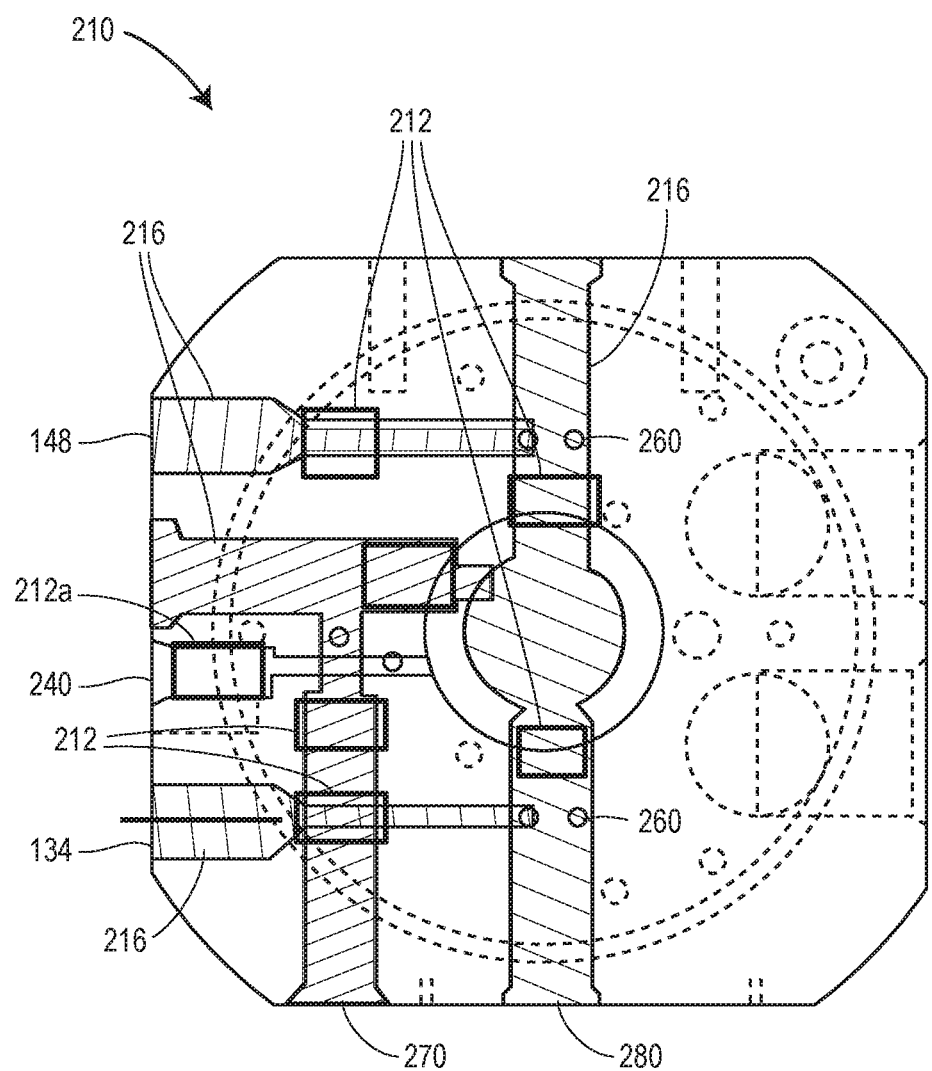
FIG. 8 is top schematic view of the electro-pneumatic controller of FIG. 4.

Turning now to FIG. 8, inlet pressure enters the controller housing at the supply port 134, passes through a first flame arrestor 212 and into a first solenoid valve 260 before passing through a second flame arrestor 212 an entering the dome. Exhaust pressure enters the controller housing at the exhaust port 148, passes through a third flame arrestor 212 and into a second solenoid 260 before passing through a fourth flame arrestor 212 and entering the dome. An internal pressure transducer 250 may be located in an external pressure port 270 between a fifth flame arrestor 212 and a sixth flame arrestor 212. A breathing flame arrestor 212a may be located in the atmospheric port 240. Three of the ports may include caps 280.

The embodiment of the electro-mechanical controller illustrated in FIGS. 4-8 includes six flame arrestors 212 that extinguish all process fluid flow paths to the atmosphere and a breathing flame arrestor 212a that extinguishes the atmospheric flow path. Furthermore, the electro-mechanical controller illustrated in FIGS. 4-8 includes a flow path for internally sensing the pressure in the dome load port 230.

In other embodiments, the electro-mechanical controller may include one or more of the following forms. In one form, the three flame arrestors at the dome load port may be combined into a single flame arrestor by joining the three fluid flow paths into one fluid flow path before entering the dome load port. In other embodiments, the flame arrestors on the pressure sensing ports may be replaced by one 0.1 mm hole to transfer the dome load pressure. In other embodiments, the flame arrestors in the fluid flow paths may be replaced by a plurality of 0.1 mm holes to extinguish any explosions. In yet other embodiments, the flame arrestor may be integrated into a base mold to reduce base material and to reduce capped ports in the base.

Based on the foregoing description, it should be appreciated that the present disclosure provides an electro-pneumatic controller that includes a flame arrestor for use in a process control device the flame arrestor assembly complies with ASME standards governing the proper installation of a flame arrestor within a process control device.

It should also be appreciated that the present disclosure provides a process control device constructed to accommodate one or more of the flame arrestor assemblies described herein. The process control device includes one or more passageways each adapted to receive a flame arrestor the process control device is thus configured to facilitate a quick and easy mechanical way of retaining a flame arrestor therein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. An electro-pneumatic controller for use with a regulator, the electro-pneumatic controller comprising:
    a base having a body, a top surface, and a bore formed within the body;
    a cover coupled to the base, the cover having an open end with a rim, the rim contacting the top surface of the base;
    a first solenoid valve disposed in the base;
    a plurality of fluid flow paths formed within the base, at least one flow path comprising a supply port and a dome in the base; and
    a first flame arrestor disposed between the supply port and the first solenoid valve, and a second flame arrestor disposed between the first solenoid valve and the dome.

2. The electro-pneumatic controller of claim 1, further comprising six flame arrestors.

3. The electro-pneumatic controller of claim 2, further comprising a breathing flame arrestor.

4. The electro-pneumatic controller of claim 1, further comprising a dome loading pressure sensor.

5. The electro-pneumatic controller of claim 4, further comprising an internal pressure sensor.

6. The electro-pneumatic controller of claim 5, further comprising an external pressure sensor.

7. The electro-pneumatic controller of claim 6, wherein the dome loading pressure sensor, internal pressure sensor, and external pressure sensor all have flame arrestors fluidly coupled thereto.

8. The electro-pneumatic controller of claim 1, wherein the process fluid is flammable.

9. The electro-pneumatic controller of claim 1, wherein the first flame and the second flame arrestor are capable of withstanding pressure created by an internal explosion.

10. The electro-pneumatic controller of claim 1, further comprising a dome load port that comprises a single flame arrestor.

11. A process control system comprising a regulator having a housing with a top portion; and an electro-pneumatic controller comprising:
    a base having a body, a top surface, and a bore formed within the body;
    a cover coupled to the base, the cover having an open end with a rim, the rim contacting the top surface of the base;
    a first solenoid valve disposed in the base;
    a plurality of fluid flow paths formed within the base, at least one flow path comprising a supply port and a dome in the base; and
    a first flame arrestor disposed between the supply port and the first solenoid valve, and a second flame arrestor disposed between the first solenoid valve and the dome.

12. The process control system of claim 11, further comprising six flame arrestors.

13. The process control system of claim 12, further comprising a breathing flame arrestor.

14. The process control system of claim 11, further comprising a dome loading pressure sensor.

15. The process control system of claim 14, further comprising an internal pressure sensor.

16. The process control system of claim 15, further comprising an external pressure sensor.

17. The process control system of claim 16, wherein the dome loading pressure sensor, internal pressure sensor, and external pressure sensor all have flame arrestors fluidly coupled thereto.

18. The process control system of claim 11, wherein the process fluid is flammable.

19. The process control system of claim 11, wherein the first flame arrestor and the second flame arrestor are capable of withstanding pressure created by an internal explosion.

20. The process control system of claim 11, further comprising a dome load port that comprises a single flame arrestor.

* * * * *

UNITED STATES PATENT AND TRADEMARK OFFICE
CERTIFICATE OF CORRECTION

PATENT NO. : 10,385,879 B2
APPLICATION NO. : 15/193490
DATED : August 20, 2019
INVENTOR(S) : Jacob T. R. Renollett et al.

It is certified that error appears in the above-identified patent and that said Letters Patent is hereby corrected as shown below:

In the Specification

At Column 2, Line 67, "body 124" should be -- body 123 --.

At Column 3, Line 11, "mechanism162" should be -- mechanism 162 --.

Signed and Sealed this
Twenty-fifth Day of August, 2020

Andrei Iancu
*Director of the United States Patent and Trademark Office*